(12) United States Patent
Yoshida

(10) Patent No.: US 7,278,686 B2
(45) Date of Patent: Oct. 9, 2007

(54) HEIGHT ADJUSTING DEVICE FOR CAR SEAT

(75) Inventor: Masami Yoshida, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 10/554,128

(22) PCT Filed: Apr. 21, 2004

(86) PCT No.: PCT/JP2004/005718

§ 371 (c)(1),
(2), (4) Date: Aug. 16, 2006

(87) PCT Pub. No.: WO2004/094180

PCT Pub. Date: Nov. 4, 2004

(65) Prior Publication Data

US 2007/0063570 A1  Mar. 22, 2007

(30) Foreign Application Priority Data

Apr. 21, 2003  (JP) .............................. 2003-115956

(51) Int. Cl.
*A47C 1/00* (2006.01)

(52) U.S. Cl. .............. 297/338; 297/344.15; 297/344.1; 297/344.12; 297/311; 248/421

(58) Field of Classification Search ............ 297/344.1, 297/344.12, 344.15, 344.14, 338; 248/421, 248/422
See application file for complete search history.

(56) References Cited

U.S. PATENT DOCUMENTS

| 4,787,594 | A | * | 11/1988 | Ikegaya et al. | ............. | 248/421 |
| 4,796,951 | A | * | 1/1989 | Tamura et al. | ............. | 297/337 |
| 4,850,561 | A | * | 7/1989 | Pipon et al. | ................ | 248/421 |
| 5,203,532 | A | * | 4/1993 | Matsuura | .................... | 248/394 |
| 5,622,406 | A | * | 4/1997 | Meschkat et al. | ........... | 297/318 |
| 5,775,661 | A | * | 7/1998 | Matsumoto et al. | ........ | 248/421 |
| 6,578,803 | B2 | * | 6/2003 | Mukugaichi | ................ | 248/157 |

FOREIGN PATENT DOCUMENTS

| JP | 2001138780 | 5/2001 |
| JP | 2001295897 | 10/2001 |
| JP | 2001304350 | 10/2001 |

* cited by examiner

*Primary Examiner*—David Dunn
*Assistant Examiner*—Erika Garrett
(74) *Attorney, Agent, or Firm*—Dann, Dorfman, Herrell and Skillman, P.C.

(57) ABSTRACT

A height adjusting device, wherein a pinion gear (8) rotated by an operating knob (7) for adjusting the height of the entire vehicle seat and a sector gear (9) are covered by a gear cover (12) and fixedly fitted to the inside of a seat side frame section (2), and a rotating shaft (7*a*) of the operating knob (7) and a supporting pin (9*a*) of the sector gear (9) are held by both the seat side frame section (2) and the gear cover (12) at their opposite ends.

1 Claim, 4 Drawing Sheets

HEIGHT ADJUSTING DEVICE FOR CAR SEAT

FIELD OF THE INVENTION

The present invention relates to a height adjusting device for a vehicle seat, which can adjust a height of the entire vehicle seat.

BACKGROUND OF THE INVENTION

As a height adjusting device for a vehicle seat, there is known a height adjusting device for a vehicle seat, which includes two pairs of spaced apart forward and rearward linkage members bridged between side frame sections of a seat cushion frame of the vehicle seat and two pairs of spaced apart brackets of upper rail members of a track mechanism for allowing the vehicle seat to be slid forward and rearward in an interior of a vehicle, connecting shafts interconnecting the linkage members, and an operating knob attached to one of the side frame sections of the seat cushion frame, and which is adapted to cause a height of the vehicle seat to be moved vertically by handling the operating knob (Japanese Patent Application Laid-Open No. 2001-138780).

The height adjusting device further includes a pinion gear arranged within the seat cushion frame, a sector gear pivotally supported through a supporting pin to the side frame section of the seat cushion frame and meshed with the pinion gear, and a linkage rod coupled at one end thereof to a portion of the sector gear which is offset from the supporting pin of the sector gear, and coupled at the other end thereof to one of the rearward linkage members.

In the height adjusting device, the pinion gear is mounted on a rotating shaft of the operating knob that is projected inward of the seat cushion frame through the one of the side frame sections of the seat cushion frame. The sector gear is pivotally supported to the side frame section of the seat cushion frame by the supporting pin that is attached to the side frame section of the seat cushion frame.

In the conventional height adjusting device, the pinion gear and the sector gear are exposed in the seat cushion frame, so that there is a possibility that any foreign materials will be caught between the pinion gear and the sector gear. Moreover, the rotating shaft of the operating knob and the supporting pin of the sector gear are simply cantilevered by the side frame section of the seat cushion frame, so that there is a possibility that when the sector gear is rotated synchronously with rotation of the pinion gear, the sector gear will be deflected, namely, the sector gear will produce runout. As a result, stable rotation of the sector gear by the pinion gear may be prevented.

SUMMARY OF THE INVENTION

It is therefore an object of the present invention to provide a height adjusting device for adjusting a height of a vehicle seat, in which any foreign materials can be prevented from being caught between a sector gear and a pinion gear, and the sector gear can be prevented from being deflected or producing runout, whereby the sector gear can be stably and positively rotated by the pinion gear.

In accordance with the present invention, there is provided a height adjusting device for adjusting a height of a vehicle seat. The vehicle seat includes a seat cushion frame supported through first and second pairs of spaced apart brackets. The seat cushion frame has a pair of first and second spaced apart side frame sections. The height adjusting device comprises first and second pairs of linkage members, the first pair of linkage members being bridged between first portions of the side frame sections and the first pair of the spaced apart brackets, the second pair of linkage members being bridged between second portions of the side frame sections and the second pair of the spaced apart brackets, a first connecting shaft coupling the second pair of linkage members, a second connecting shaft coupling the first pair of linkage members, an operating knob attached to the first side frame section, the operating knob having a rotating shaft that is projected inward of the seat cushion frame through the first side frame section, a pinion gear arranged inside the seat cushion frame and mounted on the rotating shaft of the operating knob, a sector gear pivotally supported to the first side frame section by a supporting pin, and a linkage rod coupled at one end thereof to a portion of the sector gear that is offset from the supporting pin of the sector gear, and coupled at the other end thereof to one of the second linkage members. The height adjusting device further includes a cover covering the pinion gear and the sector gear, the cover being fixed onto an inner surface of the first side frame section, the rotating shaft and supporting pin being supported to the cover, whereby ends of the rotating shaft and supporting pins are supported by both the first side frame section and the cover at their opposite ends.

DETAILED DESCRIPTION OF THE PREFERRED EMBODIMENT

Figure 1:
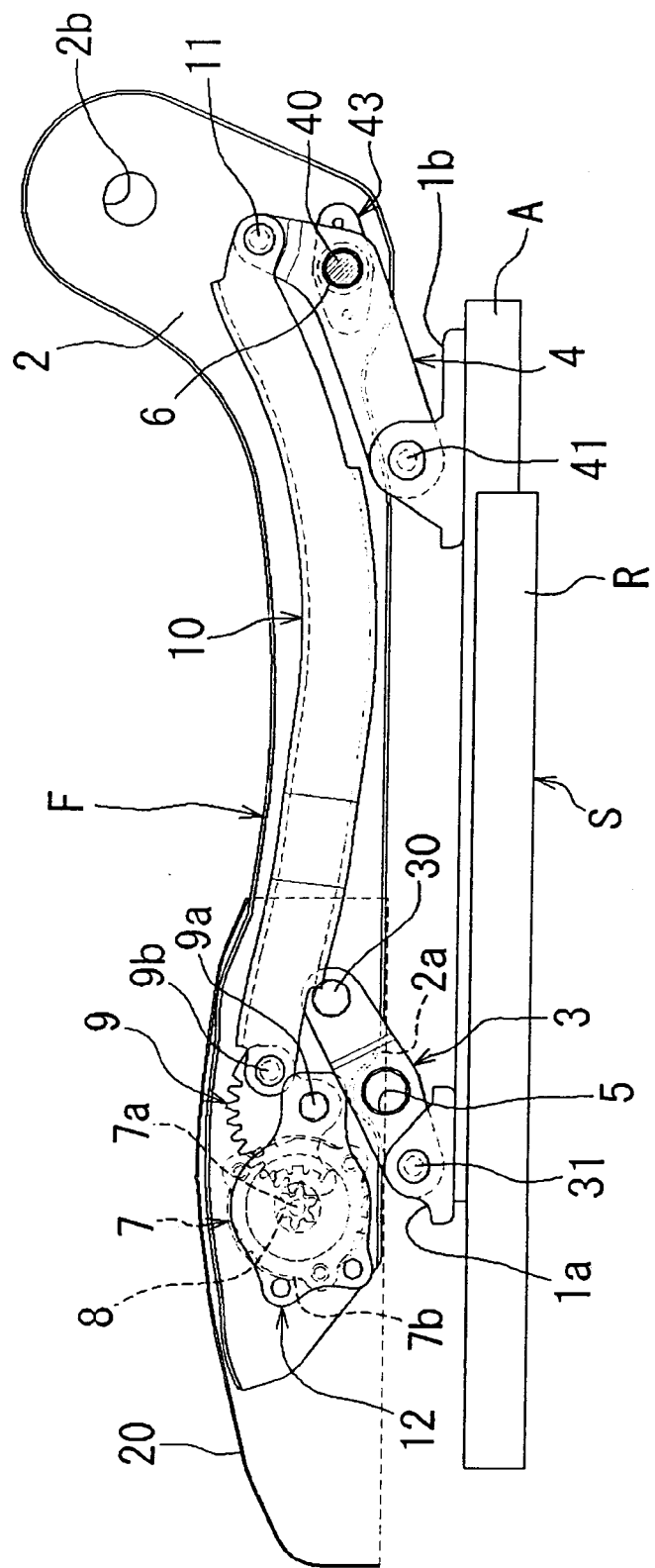
FIG. 1 is a schematic side view of a height adjusting device for adjusting a height of a vehicle seat, according to the present invention, in which the vehicle seat is in a lowered condition.

Now, a height adjusting device for a vehicle seat, according to the present invention, will be discussed hereinafter with reference to the accompanying drawings. Referring to FIG. 1, a vehicle seat to which the height adjusting device according to the present invention is applied is constructed such that the vehicle seat can be slid forward and rearward through a track mechanism S in an interior of a vehicle. The track mechanism S comprises a pair of lower rail members R spaced apart from each other and mounted on a vehicle floor in parallel with each other (only one lower rail member R is shown in FIG. 1), and a pair of upper rail members A, each of which is slidably supported to a corresponding lower rail member R (only one upper rail member A is shown in FIG. 1).

The vehicle seat includes a seat cushion frame F. A seat back (not shown) is pivotally supported to the seat cushion frame F through recliner means (not shown). The seat cushion frame F comprises a pair of spaced apart side frame sections 2 (only one side frame section 2 is shown in FIG.

1), a pan frame section 20 arranged between forward portions of the spaced apart side frame sections 2 and attached to the forward portions of the side frame sections 2, and a first pipe-shaped connecting shaft 6 arranged between rearward portions of the spaced apart side frame sections 2 and connected to the rearward portions of the spaced apart side frame sections 2. The side frame sections 2 are formed so as to extend upwardly at the rearward portions thereof in which holes 2b (only one hole 2b is shown in FIG. 1) are formed. Ends of a supporting shaft (not shown) for the recliner means are to be inserted in the holes 2b. The seat back includes a pair of spaced apart side frame sections. The spaced apart side frame sections of the seat back are supported to the supporting shaft for the recliner means. Thus, the seat back is pivotally supported to the seat cushion frame F so as to be pivotable forward and rearward relative to the seat cushion.

Each of the upper rail members A of the track mechanism S includes a pair of forward and rearward brackets 1a, 1b rising up from the upper rail member A. The height adjusting device includes two pairs of first and second linkage members 3, 4. Each of the first linkage members 3 is arranged between corresponding one of the side frame sections 2 of the seat cushion frame F and the forward bracket 1a of corresponding one of the upper rail members A. Similarly, each of the second linkage members 4 is arranged between the corresponding one of the side frame sections 2 of the seat cushion F and the rearward bracket 1b of the corresponding one of the upper rail members A. The first linkage members 3 are coupled through a second connecting shaft 5 to each other. Similarly, the second linkage members 4 are coupled through the first connecting shaft 6 to each other.

The first linkage members 3 are formed into substantially linear shapes and supported at one ends thereof to the side frame sections 2 by supporting pins 30 and at the other ends thereof to the forward bracket 1a of the upper rail members A by supporting pins 31. The first linkage members 3 are connected at substantially middle regions thereof to each other through the second connecting shaft 5. The side frame sections 2 of the seat cushion frame F are formed at lower surfaces thereof with notches 2a which allow the second connecting shaft 5 to be moved synchronously with pivotal movement of the first linkage members 3. Each of the notches 2a is formed into a substantially circular arc-shape.

Each of the second linkage members 4 is formed into a substantially L-shape. The second linkage members 4 are coupled at substantially middle portions thereof to the side frame sections 2 by supporting pins 40 that project from both ends of the first connecting shaft 6. One ends of the second linkage members 4 are connected to the rearward brackets 1b of the upper rail members A by supporting pins 41.

The height adjusting device for the vehicle seat further includes an operating knob 7 having a rotating shaft 7a and mounted on an outer surface of the one of the side frame sections 2 with the rotating shaft 7a penetrating through the side frame section 2 and projecting into the seat cushion frame F, a pinion gear 8 arranged within an inside of the seat cushion frame F and mounted on the rotating shaft 7a of the operating knob 7 that is penetrated inward of the seat cushion frame F through the side frame section 2, a sector gear 9 rotatably supported to the side frame section 2 by a supporting pin 9a and meshed with the pinion gear 8, and a linkage rod 10 arranged between the sector gear 9 and one of the second linkage members 4 that is arranged on the side of the side frame 2 to which the operating knob 7 is mounted.

Figure 2:
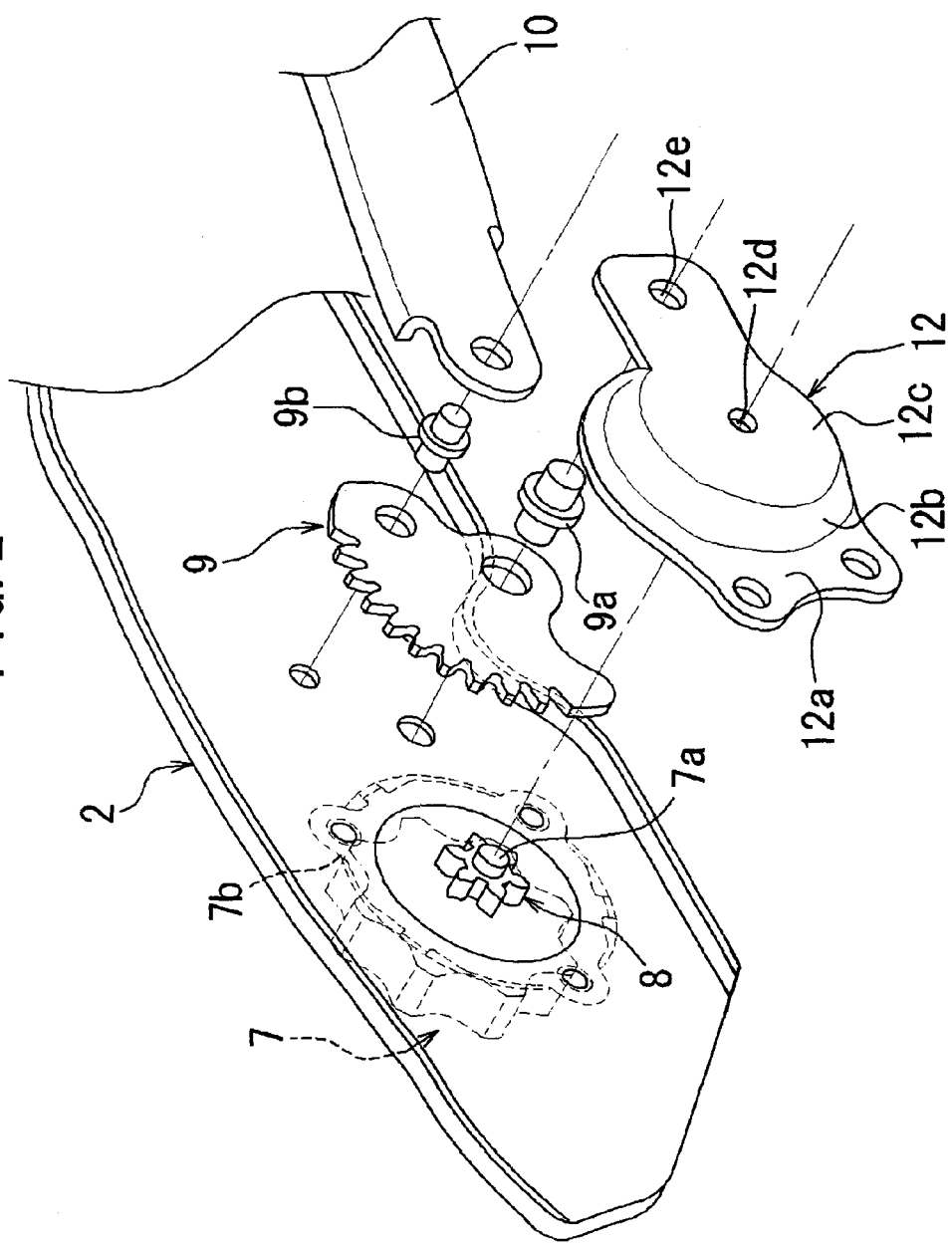
FIG. 2 is a schematic exploded perspective view illustrating a pinion gear and a sector gear which are components for the height adjusting device shown in FIG. 1.

In the illustrated embodiment, as the operating knob 7, an operating knob that is of a dial-type is employed. Referring to FIG. 2, the operating knob 7 includes a body supporting the rotating shaft 7a and a mounting section 7b of a plate shape, and is arranged on the outer surface of the side frame section 2 with the mounting section 7b being attached onto the outer surface of the side frame section 2 and with the rotating shaft 7a being penetrated through the side frame section 2. The operating knob body is constructed so as to be rotatable relative to the mounting section 7b.

The sector gear 9 is rotatably supported at a base portion thereof to the side frame section 2 by the supporting pin 9a and coupled at a portion thereof that is offset from the supporting pin 9a, to one end of the linkage rod 10 by a supporting pin 9b. As shown in FIG. 1, the other end of the linkage rod 10 is coupled to an upper end of the one of the second linkage members 4 by a supporting pin 11.

As shown in FIG. 2, a gear cover 12 for covering the pinion gear 8 and the sector gear 9 is provided. The gear cover 12 comprises a base portion 12a, a substantially cylindrical-shaped portion 12b projecting laterally from the base portion 12a, and a top portion 12c lying on the substantially cylindrical-shaped portion 12b and extending laterally from the substantially cylindrical-shaped portion 12b. The top portion 12c is formed with a first hole 12d and a second hole 12e in which the rotating shaft 7a of the operating knob 7 and the supporting pin 9a of the sector gear 9 are respectively inserted.

The gear cover 12 is secured on an inner surface of the side frame section 2 with the cylindrical-shaped portion 12b and top portion 12c covering the pinion gear 8 and the sector gear 9, with the base portion 12a being mounted on the inner surface of the side frame section 2, and with the first and second holes 12d, 12e of the gear cover 12 receiving the rotating shaft 7a of the operating knob 7 and the supporting pin 9a of the sector gear 9, respectively. Thus, the pinion gear 8 and the sector gear 9 are arranged between the side frame section 2 and the gear cover 12 so as not to be exposed. In addition, the rotating shaft 7a of the operating knob 7 and the supporting shaft 9a of the sector gear 9 are supported by both the side frame section 2 and the gear cover 12 at their opposite ends.

Figure 3:
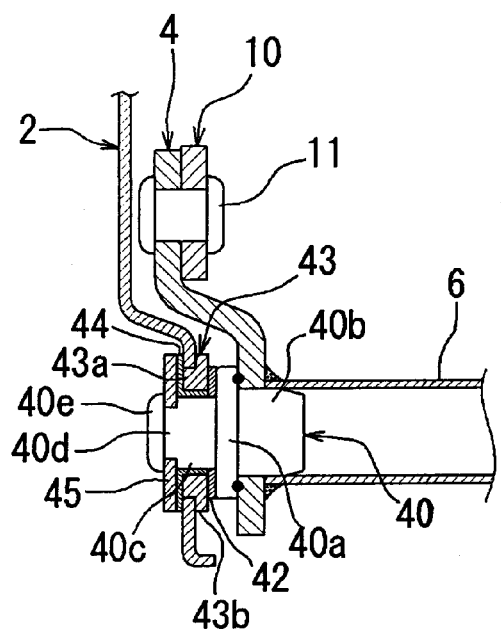
FIG. 3 is a schematic sectional view illustrating a combination of a connecting shaft and a supporting pin which are components for the height adjusting device shown in FIG. 1.

Referring now to FIG. 3, inner end portions of the supporting pins 40 (only one supporting pin 40 is shown in FIG. 3) for the first connecting shaft 6 are inserted through the second linkage members 4 in the ends of the first connecting shaft 6 and welded to the second linkage members 4. Outer end portions of the supporting pins 40 are penetrated through the side frame sections 2.

Figure 4:
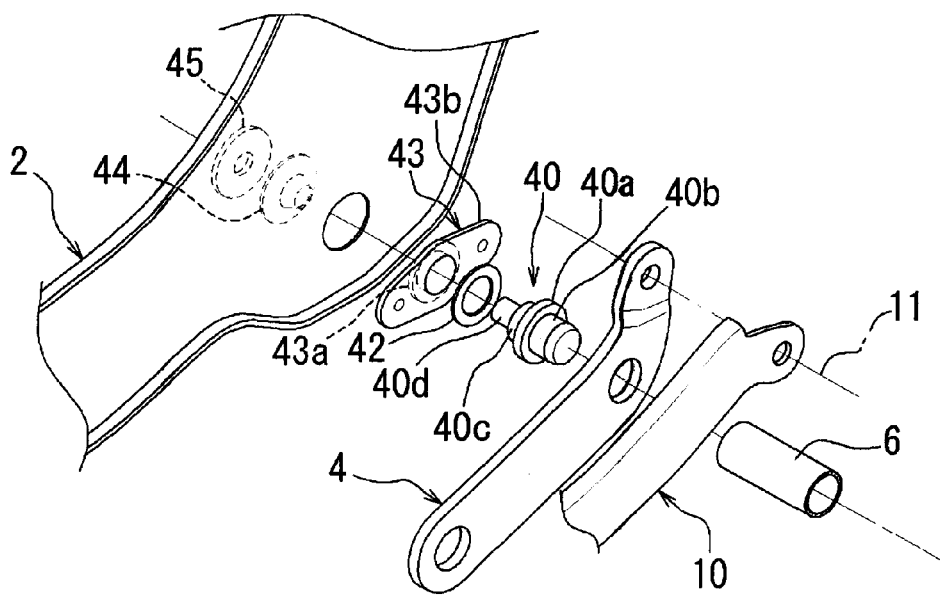
FIG. 4 is a schematic exploded perspective view illustrating the connecting shaft and the supporting pin which are shown in FIG. 3.

Referring to FIG. 4, each of the supporting pins 40 (only one supporting pin 40 is shown in FIG. 4) includes a circumferential flange portion 40a provided between the inner end portion 40b extending inwardly from the circumferential flange portion 40a and inserted in corresponding one of the ends of the first connecting shaft 6 through corresponding one of the second linkage members 4, and the outer end portion extending outwardly from the circumferential flange portion 40a and penetrating through corresponding one of the side frame sections 2. The outer end portion of the supporting pin 40 comprises a large diameter region 40c and a relatively small diameter region 40d. The small diameter region 40d of the supporting pin 40 is to be riveted over after the outer end portion of the supporting pin 40 is penetrated through the side frame section 2.

In order to cause the outer end portion of the supporting pin 40 to be securely born to the corresponding side frame section 2, a first washer 42, a bearing collar 43, a bush 44, and a second washer 45 are employed. The bearing collar 43 comprises a boss portion 43a and a pair of protruding portions 43b laterally protruding in directions opposite to each other from the boss portion 43a. The bearing collar 43 is mounted on the inner surface of the side frame section 2 with the boss portion 43a being fitted in a hole of the side frame section 2 and with the protruding portions 43b being welded to the side frame section 2.

Now, a procedure for connecting an end of the first connecting shaft 6 to the corresponding side frame section 2 by the supporting pin 40 will be discussed in greater detail hereinafter. First of all, the inner end portion 40b of the supporting pin 40 is penetrated through the second linkage member 4 in such a manner that the circumferential flange portion 40a of the supporting pin 40 is applied onto an outer surface of the second linkage member 4. Then, the circumferential flange portion 40a of the supporting pin 40 is welded onto the outer surface of the second linkage member 4 by projection welding (see FIG. 3).

The inner end portion 40b of the supporting pin 40 is then fitted into the end of the first connecting shaft 6. The outer end portion of the supporting pin 40 is inserted through the first washer 42 and the boss portion 43a of the bearing collar 43 and then inserted through the hole of the side frame section 2.

The bush 44 is then mounted on the outer end portion of the supporting pin 40 that has been projected outward of the side frame 2, and fitted into the boss portion 43a of the bearing collar 43 through the hole of the side frame section 2. The second washer 45 is then mounted on the outer end portion of the supporting pin 40. Thereafter, the small diameter portion 40d of the supporting pin 40 is riveted over the second washer 45 as a riveted portion 40e (see FIG. 3). Moreover, the first connecting shaft 6 is welded to the second linkage member 4. The other end of the first connecting shaft 6 is connected to the other of the side frame sections 2 in the same manner as the one end of the first connecting shaft 6 is connected to the one of the side frame sections 2. Thus, the first connecting shaft 6 is rotatable relative to the side frame sections 2.

As described above, the inner end portions 40b of the supporting pins 40 are fitted in the ends of the first connecting shaft 6 through the second linkage members 4 and welded to the second linkage members 4, and the outer end portions of the supporting pins are connected to the side frame sections 2. Thus, the supporting pins 40 cab be easily coupled to the side frame sections 2 and the ends of the first connecting shaft 6 in such a manner that the supporting pins 40 act as supports for the pivotal movement of the second linkage members 4.

In the height adjusting device constructed as discussed above, in a condition where the vehicle seat is lowered as shown in FIG. 1, the linkage rod 10 is thrust rearward by the sector gear 9 and the first and second linkage members 3, 4 are collapsed rearward.

Figure 5:
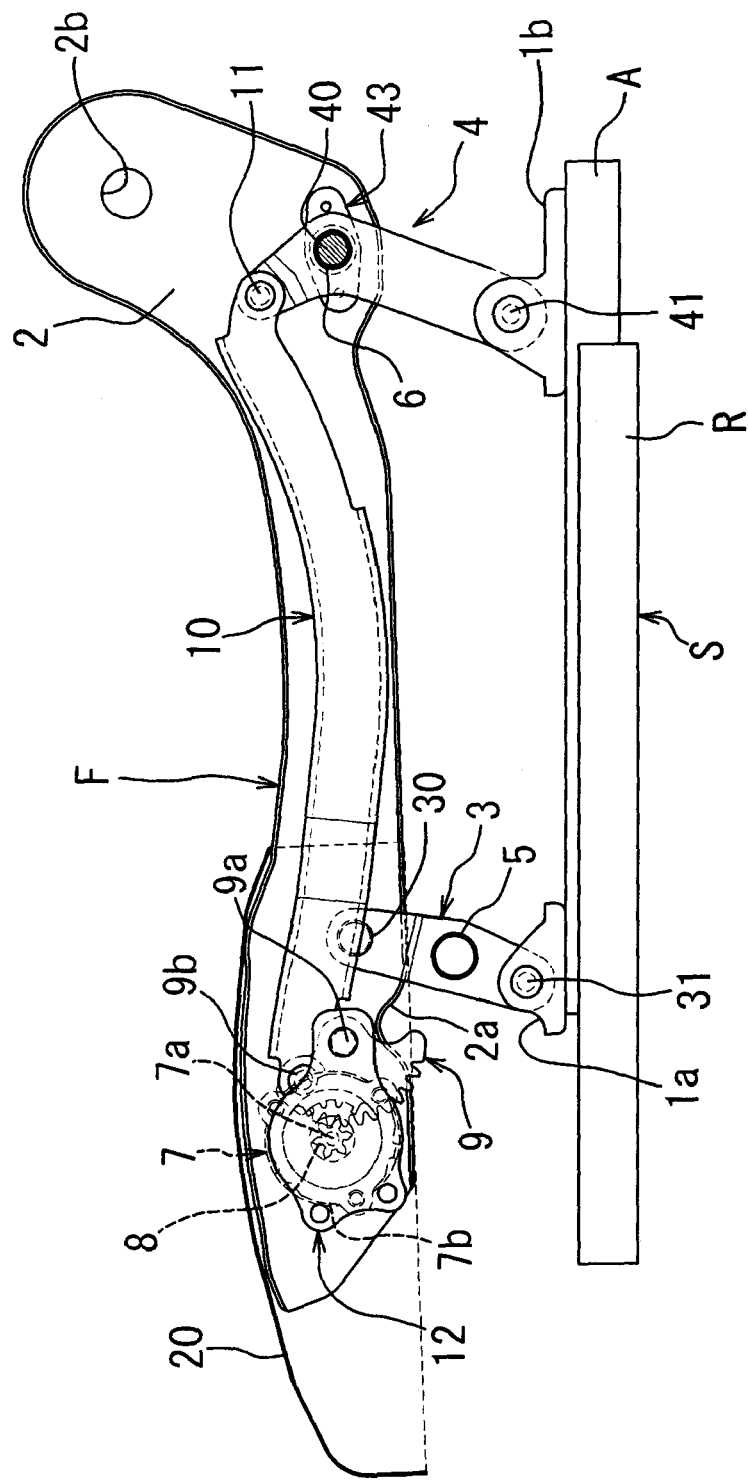
FIG. 5 is a schematic side view of the height adjusting device of FIG. 1, in which the vehicle seat is in a lifted-up condition.

In this condition, when the body of the operating knob 7 is rotated in a predetermined direction, the pinion gear 8 is simultaneously rotated. Synchronously with the rotation of the pinion gear 8, the sector gear 9 is rotated about the supporting pin 9a in a counterclockwise direction in FIG. 1, whereby the linkage rod 10 is drawn forward. Simultaneously with the forward movement of the linkage rod 10, the second linkage members 4 are rotated around the supporting pins 41 so as to operatively stand up and the first linkage members 3 are also rotated around the supporting pins 31 so as to operatively stand up. Thus, the vehicle seat is lifted up as shown in FIG. 5.

The second linkage members 4 are supported to the side frame sections 2 through the supporting pins 40 coupled to the ends of the first connecting shaft 6, so that the first and second linkage members 3, 4 can be stably moved during adjusting of the height of the vehicle seat. Moreover, the pinion gear 8 and the sector gear 9 are arranged between the side frame section 2 and the gear cover 12 so as to be covered by the gear cover 12, so that any foreign materials can be prevented from being caught between the pinion gear 8 and the sector gear 9. In addition, the rotating shaft 7a of the operating knob 7 that supports the pinion gear 8, and the supporting pin 9a supporting the sector gear 9 are supported by both the side frame section 2 and the gear cover 12 at their opposite ends, so that the sector gear 9 can be securely prevented from being deflected, namely, producing runout. Therefore, the sector gear 9 can be stably and positively rotated by the pinion gear.

What is claimed is:

1. A height adjusting device for adjusting a height of a vehicle seat, said vehicle seat including a seat cushion frame supported through first and second pairs of spaced apart brackets, said seat cushion frame having a pair of first and second spaced apart side frame sections, said height adjusting device comprising first and second pairs of linkage members, said first pair of linkage members being bridged between first portions of said side frame sections and said first pair of said spaced apart brackets, said second pair of linkage members being bridged between second portions of said side frame sections and said second pair of said spaced apart brackets, a first connecting shaft interconnecting said second pair of linkage members, a second connecting shaft interconnecting said first pair of linkage members, an operating knob attached to said first side frame section, said operating knob having a rotating shaft that is projected inward of said seat cushion frame through said first side frame section, a pinion gear arranged inside said seat cushion frame and mounted on said rotating shaft of said operating knob, a sector gear pivotally supported to said first side frame section by a supporting pin, and a linkage rod coupled at one end thereof to a portion of said sector gear that is offset from said supporting pin of said sector gear, and coupled at the other end thereof to one of said second linkage members, characterised in that said height adjusting device further includes a cover covering said pinion gear and said sector gear, said cover being fixed onto an inner surface of said first side frame section, ends of said rotating shaft and supporting pin being supported by said cover, whereby said rotating shaft and said supporting pin are supported by both said first side frame section and said cover.

\* \* \* \* \*